UNITED STATES PATENT OFFICE.

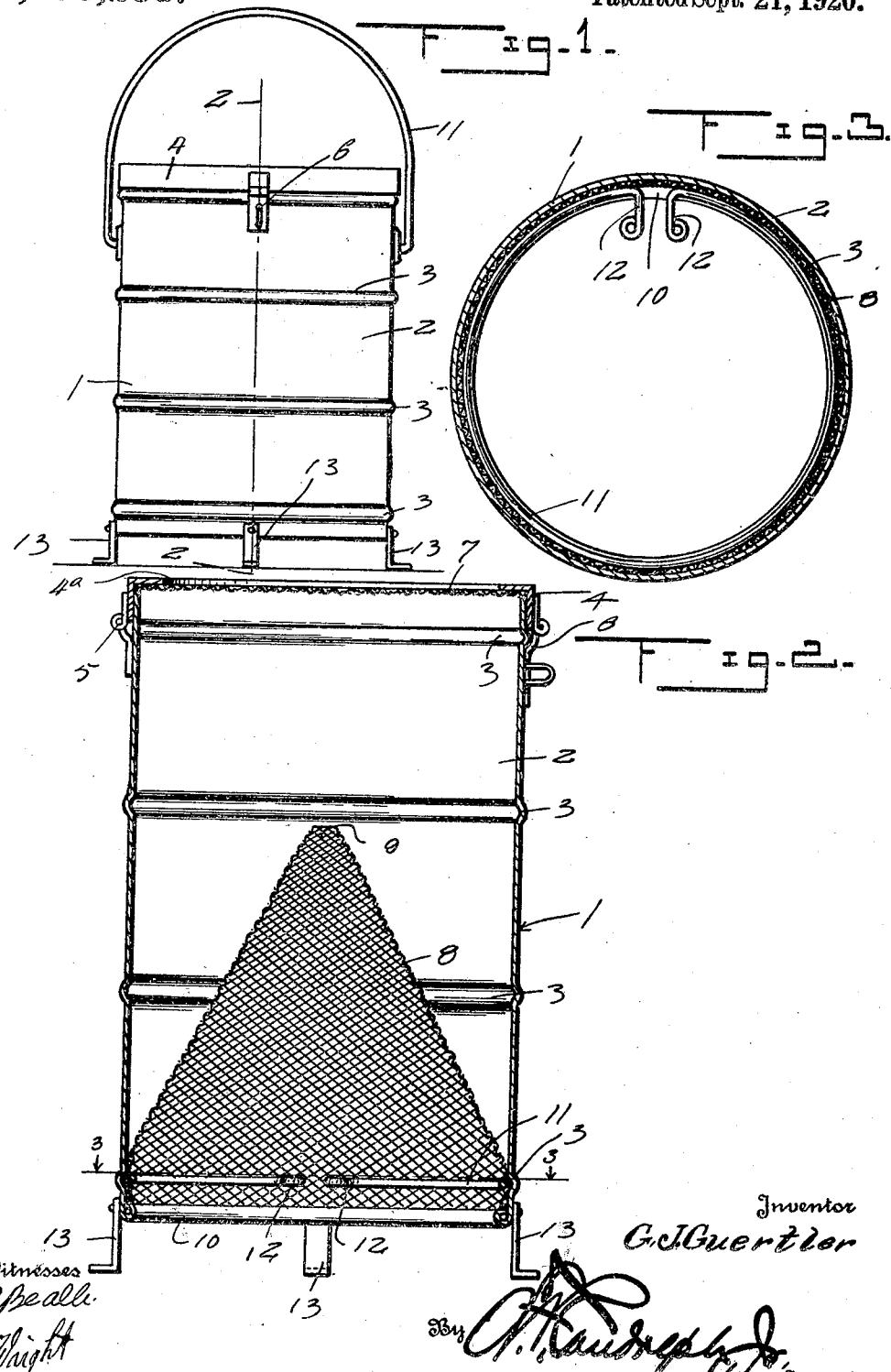

GEORGE J. GUERTLER, OF CINCINNATI, OHIO.

FLYTRAP.

1,353,233. Specification of Letters Patent. Patented Sept. 21, 1920.

Application filed April 2, 1918. Serial No. 226,237.

*To all whom it may concern:*

Be it known that I, GEORGE JOSEPH GUERTLER, a citizen of the United States, residing at Cincinnati, in the county of Hamilton and State of Ohio, have invented certain new and useful Improvements in Flytraps; and I do hereby declare the following to be a full, clear, and exact description of the invention, such as will enable others skilled in the art to which it appertains to make and use the same.

This invention relates to a fly trap and the primary object of the invention is to provide an improved fly trap in which the screen portions thereof are readily removable from the trap body, so that the screen parts can be readily removed and replaced when worn out.

Another object of this invention is to provide an improved fly trap, which consists of an imperforate cylindrical opaque body, having a removable cover or top which holds in position a wire screen, and a removable conical wire inlet, which is held in the body by means of a compressible resilient annular member.

A further object of the invention is to provide an improved trap of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawing, forming a part thereof in which:

Figure 1 is a side elevation of the improved trap,

Fig. 2 is a vertical section of the same taken on the line 2—2 of Fig. 1, and

Fig. 3 is a transverse section taken on the line 3—3 of Fig. 2.

Referring to the drawings in detail, wherein similar reference numerals designate corresponding parts throughout the several views, the numeral 1 generally indicates the improved trap which consists of a cylindrical metallic body 2 having the annular ribs 3, which form means for strengthening the same. A cover 4 is pivotally secured as at 5 to the upper end of the body and is provided with a hasp 6 or other suitable fastener for holding the same in closed position. The cover 4 is provided with a cut out portion 4ª. A screen 7 of wire is positioned between the upper edge of the body 2 and the cover.

The lower end of the body is open and is provided with an upwardly extending conical member 8, having the upper end thereof open as at 9 to form an inlet into the body. The lower end of the body 2 is provided with an inwardly rolled edge 10, which forms means for supporting the conical wire member.

A removable annular spring wire member 11 is arranged to engage the inner surface of the conical member 8 of the large portion thereof, so as to clamp the same and prevent accidental movement thereof. The conical member is adapted to be clamped between the spring wire member 11 and one of the annular ribs or corrugations 3. The ends of the annular wire member 11 are bent outwardly in spaced parallel relation as at 12 to form hand grips, whereby the ends of the spring wire member may be brought together, so as to release the conical screen member 8, when so desired.

In the operation of the improved device a suitable bait receptacle is placed under the conical member and the flies attracted by the same will enter the conical member 8 and the flies will be attracted by the light entering the screen 7 and will fly upward and into the body of the trap.

From the foregoing description it can be seen that an improved trap is provided in which the screen portions thereof can readily be removed or replaced in a convenient and quick manner.

In practice, I have found that the form of my invention illustrated in the accompanying drawings and referred to in the above description, as the preferred embodiment, is the most efficient and practical; yet realizing that conditions concurrent with the adoption of my device will necessarily vary, I desire to emphasize the fact that various minor features of details of construction, proportion and arrangement of parts may be resorted to, when required, without sacrificing any of the advantages of my invention as set forth.

What I claim as new is:

A fly trap comprising an upstanding cylindrical body open at its opposite ends, supporting legs depending from the lower end of said body, the lower edge of the body being turned inwardly and upwardly, a frusto-conical screen member resting in the inwardly and upwardly turned lower end of the body member and having its small upper end open, removable spring clamping means within said frusto-conical screen member to retain the latter in position, a cover hinged upon the upper end of said body and having an open central portion, and a removable upper screen member clamped on said upper end of the body by said cover when the latter is in closed position.

In testimony whereof I affix my signature in presence of two witnesses.

GEORGE J. GUERTLER.

Witnesses:
 HERMAN SCHMEES,
 J. P. FRISZ